(12) United States Patent
Fleischer

(10) Patent No.: US 8,596,624 B2
(45) Date of Patent: Dec. 3, 2013

(54) SELF-ALIGNING PIVOTABLE MANDREL ASSEMBLY

(75) Inventor: Karl Scott Fleischer, Denver, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 406 days.

(21) Appl. No.: 12/797,074

(22) Filed: Jun. 9, 2010

(65) Prior Publication Data
US 2011/0304085 A1 Dec. 15, 2011

(51) Int. Cl.
*B25B 27/14* (2006.01)
*B25B 1/20* (2006.01)
*B23Q 1/25* (2006.01)
*B41F 17/08* (2006.01)

(52) U.S. Cl.
USPC .............. 269/55; 269/51; 269/191; 29/281.1; 101/38.1; 101/376

(58) Field of Classification Search
USPC .......... 269/51, 55, 63, 170, 191, 244; 29/271, 29/281.1; 101/38.1–40, 376
See application file for complete search history.

(56) References Cited

U.S. PATENT DOCUMENTS

| | | | | |
|---|---|---|---|---|
| 2,085,389 A * | 6/1937 | Purinton | ........................ | 118/218 |
| 2,936,701 A * | 5/1960 | Stuchbery | ........................ | 101/40 |
| 3,162,115 A * | 12/1964 | Bauer | ............................. | 101/39 |
| 3,356,019 A * | 12/1967 | Zurick | ............................ | 101/39 |
| 3,371,603 A * | 3/1968 | Brigham | ........................ | 101/175 |
| 3,548,745 A | 12/1970 | Sirvet et al. | | |
| 4,018,151 A * | 4/1977 | Urban et al. | .................... | 101/40 |
| 4,267,771 A | 5/1981 | Stirbis | | |
| 4,380,964 A * | 4/1983 | Abe et al. | ........................ | 118/50 |
| 4,498,387 A * | 2/1985 | Stirbis | ............................ | 101/40 |
| 4,741,266 A * | 5/1988 | Stirbis et al. | .................... | 101/40 |
| 4,757,668 A * | 7/1988 | Klinkel et al. | .................. | 53/451 |
| 4,790,078 A * | 12/1988 | Schneider | ....................... | 33/503 |
| 4,926,788 A | 5/1990 | Metcalf | | |
| 5,320,430 A * | 6/1994 | Kobayashi | ...................... | 384/49 |
| 5,595,376 A * | 1/1997 | Hua | ............................. | 269/48.1 |
| 6,167,805 B1 | 1/2001 | Williams et al. | | |
| 2008/0282913 A1* | 11/2008 | Noll et al. | ........................ | 101/39 |

\* cited by examiner

*Primary Examiner* — Joshua J Michener
*Assistant Examiner* — Elizabeth A Plummer
(74) *Attorney, Agent, or Firm* — Eckert Seamans Cherin & Mellott, LLC; David C. Jenkins

(57) ABSTRACT

A mandrel assembly for a can body can decoration machine is provided. The mandrel assembly includes a bearing assembly that creates a virtual pivot point whereby the mandrel may pivot relative to the supporting mandrel shaft. To allow the mandrel to pivot relative to the mandrel shaft, the bearing assembly is located at one location and is the only contact point between the mandrel and the mandrel shaft.

18 Claims, 4 Drawing Sheets

SELF-ALIGNING PIVOTABLE MANDREL ASSEMBLY

BACKGROUND OF THE INVENTION

1. Field of the Invention

The disclosed concept relates generally to a mandrel assembly coupled to a mandrel carrier for decorating a container and, more specifically, to a mandrel assembly wherein the mandrel is self-aligning to the surface of the can decoration device.

2. Background Information

Decorations, i.e. any indicia, are typically applied to a can by a can decoration device that utilized a rotating "blanket." The blanket, or more typically a plurality of blankets, are disposed on the circumference of a large diameter rotating disk, i.e. large diameter relative to the can body to which the can decoration is applied. One or more ink stations apply ink in a desired pattern to the blankets prior to the blankets contacting the cans. The cans are made to rotate at a speed corresponding to the blanket and then brought into contact with the blanket. The can is in contact with the blanket for substantially one full rotation of the can. During the period in which the can and blanket contact each other, the ink is transferred from the blanket to the can. The can may then be subjected to further treatments, e.g. varnish, drying, etc., to ensure the ink does not smudge.

The device used to support and manipulate the cans during the can decoration procedure is a mandrel turret. Generally, the mandrel turret includes a disk having an axis of rotation. The mandrel turret disk axis of rotation is substantially parallel to the axis of rotation of the blanket wheel. A plurality of elongated mandrel assemblies are coupled to the mandrel turret disk. Each mandrel assembly longitudinal axis is generally parallel to the axis of rotation of the blanket wheel and the mandrel turret disk axis of rotation, however, if the mandrels need to have a certain amount of radial "toe-in," as described below, the mandrel turret disk axis of rotation may be angled toward the blanket wheel axis.

As noted above, the can must be rotating as it contacts an inked blanket. This rotation is accomplished by the mandrel assembly upon which the can is mounted. It is initially noted that at this point in the manufacture of the can, the can is incomplete, i.e. the can does not have a top. Thus, the can is, essentially a cup having a generally planar base with a depending sidewall. The can is disposed over the distal end of the mandrel assembly and held in place by a vacuum. That is, the mandrel assembly is structured to draw a vacuum at the distal end whereby a can is held in place.

To effect the rotation of the can, the mandrel assembly includes a mandrel and a mandrel shaft. Both the mandrel and the mandrel shaft are generally cylindrical, but have portions with different radii. The mandrel shaft includes a passage through which a vacuum may be drawn. One end of the mandrel shaft, the proximal end, is coupled to the mandrel turret disk. Thus, the mandrel shaft is cantilevered from the mandrel turret disk. Preferably, the mandrel shaft does not rotate relative to the mandrel turret disk (but does rotate about the mandrel turret disk axis as the mandrel turret disk rotates).

The mandrel is, generally, a cylindrical shell that is disposed over the mandrel shaft. The mandrel is generally open at both ends. The mandrel is structured to concentrically rotate about the mandrel shaft. A bearing assembly is disposed between the mandrel and the mandrel shaft. The bearing assembly allows the mandrel to rotate relative to the mandrel shaft. A rotation device, typically a system of belts coupled to the can decoration device blanket wheel to one or more mandrels, is structured to bring each mandrel to the proper rotational speed just before the can contacts the inked blanket. The rotation device is decoupled from the mandrel as, or just before, the can contacts the inked blanket. It is further noted that the mandrel must be a specific distance from the blanket so as to create the proper pressure between the can and the inked blanket that causes the ink to transfer without distorting the blanket thereby causing a distorted image or causing the mandrel, and therefore the can, to slow its rotational speed, which also causes a distorted image on the can.

In this configuration, the various components of the can decoration device and the mandrel turret disk must be precisely aligned and structured to rotate at specific speeds to ensure the can decoration is applied to the cans without smudging, blurring or otherwise distorting the indicia. Accordingly, the elements of the mandrel turret disk are traditionally very rigid so as to control their position relative to other elements.

Still, even with very rigid components, one cause of misalignment is the fact that the mandrel assembly is cantilevered. In this configuration, the distal end of the mandrel assembly is known to deflect in response to the pressure applied thereto by the blanket at the time of applying the image to the can. One method of compensating for this deflection is to construct the mandrel assembly with a selected radial displacement, or "toe-in," of the mandrel assembly. That is, the mandrel turret disk is tilted radially toward the blanket wheel. This causes the distal end of the mandrel assembly to be located closer to the blanket wheel axis of rotation than the proximal end of the mandrel assembly. Thus, when the blanket contacts the can (on the mandrel), the bias created by the blanket causes the mandrel assembly to deflect inwardly a slight amount whereby the longitudinal axis of the mandrel assembly is substantially parallel to the axis of rotation of the blanket wheel.

It is noted that, as part of the rigid construction of a mandrel assembly, and as shown in FIG. 1, there are typically two sets of bearings 2, 3 disposed between the mandrel 4 and the mandrel shaft 5. There is usually a ball bearing assembly 2 disposed adjacent the distal end of the mandrel assembly and a needle bearing 3 assembly disposed adjacent the proximal end of the mandrel assembly. By supporting the mandrel on the mandrel shaft at two locations along the longitudinal axis of the mandrel assembly, the mandrel, while rotatable, is in a fixed orientation relative to the mandrel shaft.

Thus, in order to get consistent and good quality can decoration of all cans, each mandrel assembly must be significantly parallel to the axis of rotation of the blanket wheel. Any out of parallel condition on the part of a mandrel assembly can result in every can on that mandrel assembly not being fully printed. When this happens, it is necessary to determine which part in the related mandrel assembly is out of specification and replace it. This can result in a significant amount of machine downtime. Sometimes when an operator detects such a misalignment, rather than perform the proper maintenance, the operator will simply increase the can decoration device pressure in order to get the out-of-specification mandrel assembly to print properly. This, however, results in higher than necessary loading of the remaining mandrel assemblies and causes reduced service life of the mandrel turret disk assembly in general.

SUMMARY OF THE INVENTION

The disclosed and claimed concept overcomes the problem of misaligned mandrel assemblies by allowing the mandrel to "float" on the mandrel shaft. This is accomplished by providing a mandrel assembly wherein the bearing assembly creates a virtual pivot point whereby the mandrel may pivot relative to the mandrel shaft. That is, while the traditional method of constructing a mandrel turret disk assembly, and more specifically a mandrel assembly, requires a tight, but rotatable, fit between components at two support locations between the mandrel and the mandrel shaft, the disclosed mandrel assembly allows for a bearing assembly having a single, or two very close, bearing units between the mandrel and the mandrel shaft. Moreover, the bearing unit(s) is/are sized so as to allow the mandrel to pivot relative to the mandrel shaft. This intentional capability of the mandrel to move relative to the mandrel shaft is defined herein as "floating."

In operation, the float of the mandrel relative to the mandrel shaft allows the mandrel to align with the blanket. That is, even if the mandrel shaft were misaligned, i.e. not substantially parallel to the axis of rotation of the blanket wheel, the bias created by the blanket contacting the mandrel causes the mandrel to pivot relative to the mandrel shaft so that the mandrel becomes substantially parallel to the axis of rotation of the blanket wheel. This configuration allows for the construction of mandrel assemblies and mandrel turret disks with less exacting specifications and allows the mandrels to be automatically aligned with the axis of rotation of the blanket wheel.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As used herein, "significantly parallel," i.e. when comparing two axes of rotation, means the two axes are within about 0.007 degrees of each other and/or 0.001 degrees per inch of mandrel length.

As used herein, "substantially parallel," i.e. when comparing two axes of rotation, means the two axes are within about 0.0035 degrees of each other and/or 0.005 degrees per inch of mandrel length.

As used herein, a "virtual pivot" is a point about which a physical element pivots but where no portion of that element exists. The "virtual pivot" is created by a plurality of physical pivot points that are spaced from the "virtual pivot." Further, a "virtual pivot" is intentionally created and does not exist inherently due to manufacturing tolerances. That is, for example, in a ball bearing unit having an inner race and an outer race with ball bearings disposed therebetween, manufacturing tolerances allow for a radial clearance, i.e. the passage defined by the two races is slightly larger than the diameter of the ball bearings. While such a clearance may allow one race to pivot, or rock, relative to the other race, such a slight and unintentional amount of pivot does not establish a "virtual pivot point."

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, "correspond" indicates that two structural components with complementary shapes are sized to engage each other, i.e. at least partially contact each other, with a minimal amount of friction. Thus, an opening which corresponds to a member has a substantially similar shape and is sized slightly larger than the member so that the member may pass through the opening with a minimal amount of friction.

As used herein, a "can body" is a generally cylindrical body having one closed end. The periphery of the closed end is generally disposed in a plane, but the medial portion of the closed end may be arcuate.

Figure 1:
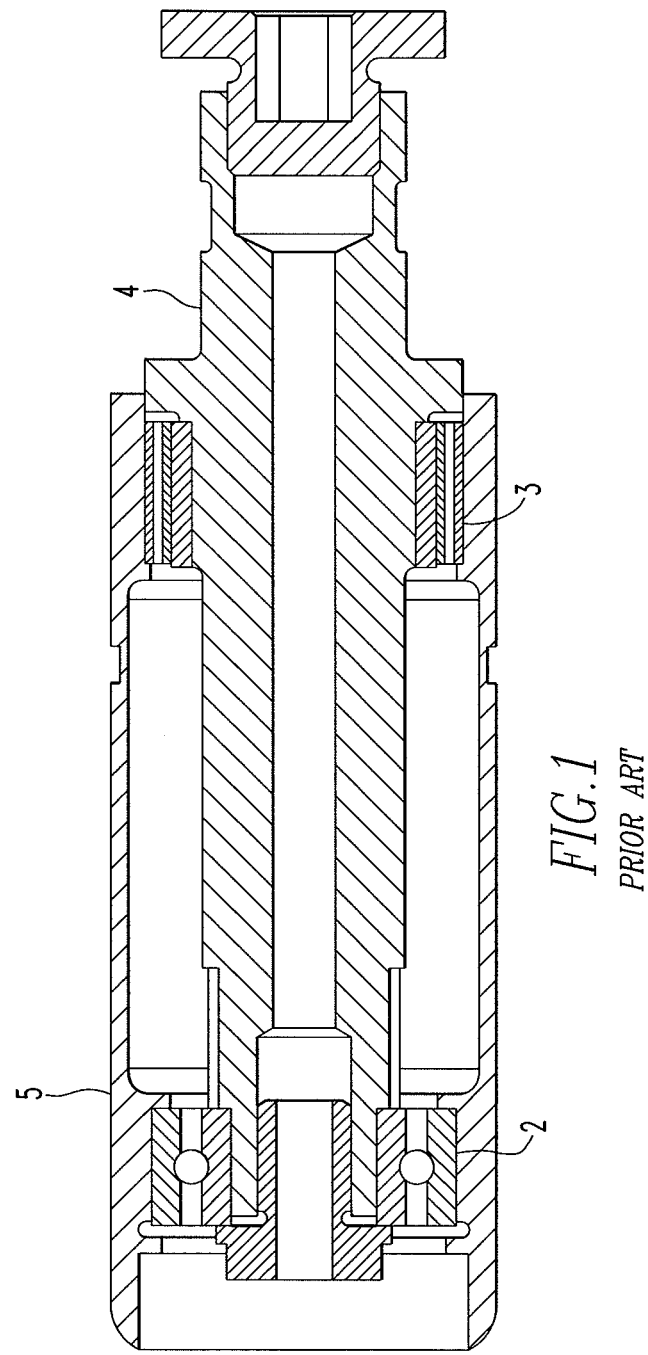
FIG. 1 is a cross-sectional view of a prior art mandrel assembly.
Figure 2:
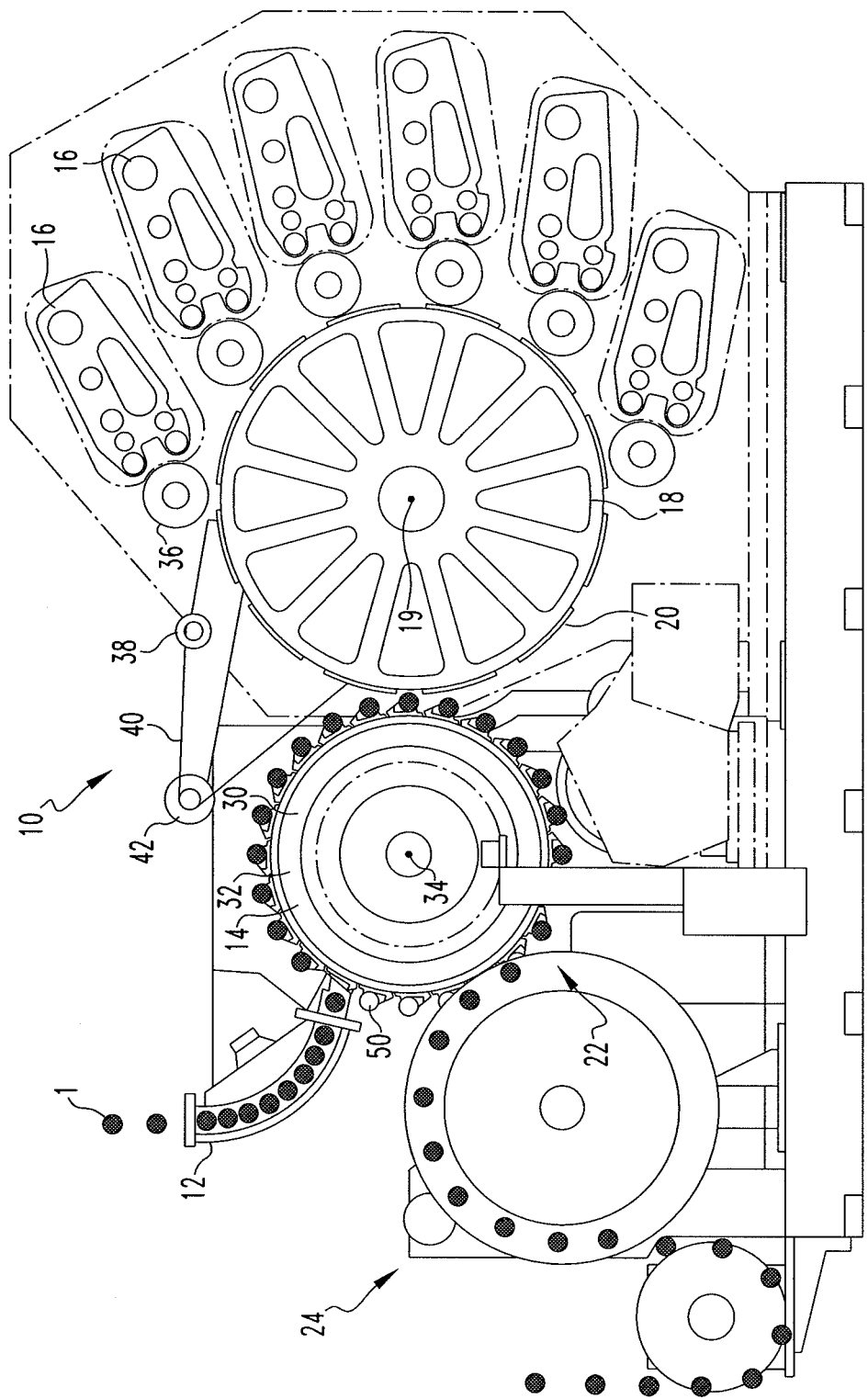
FIG. 2 is a side view of a can decoration machine.

A can decoration machine 10 for a can body 1 is shown in FIG. 2. The can decoration machine 10 includes a can body infeed 12, a mandrel turret assembly 14, a plurality of ink stations 16, a blanket wheel 18 having a plurality of blankets 20 disposed about the outer circumference, and a can transfer assembly 22. The mandrel turret assembly 14 includes a mandrel carrier 30 which, as shown, is a disk 32 having an axis of rotation 34. It is noted that some mandrel carriers 30 include multiple plates that slide radially relative to each other thereby creating a disk assembly with a variable radius. This configuration is not relevant to the present invention and is not shown, but, the concept disclosed herein may operate with such a mandrel carrier 30. Therefore, as used herein, a "mandrel carrier" is not limited to a simple disk 32.

A plurality of mandrel assemblies 50, discussed in detail below, are coupled to the mandrel carrier 30. The mandrel assemblies 50 are generally elongated and coupled at one end to the mandrel carrier 30. Each mandrel assembly 50, and more specifically each mandrel shaft 52, extends substantially parallel to the mandrel carrier axis of rotation 34. The blanket wheel 18 is also structured to rotate on an axis 19 that extends substantially parallel to the mandrel carrier axis of rotation 34. The blankets 20 are disposed on the outer surface of the blanket wheel 18. Thus, the blankets 20 are positioned to laterally, or radially, engage the mandrel assemblies 50. As is known, each ink station 16 applies an ink to the blankets 20, typically via an intermediate plate cylinder 36. The ink stations 16 are disposed, generally, on the side of the blanket wheel axis of rotation 19 opposite the mandrel carrier 30. A prespin assembly 38 (shown schematically) which typically comprises a plurality of belts 40 and guide wheels 42 is operatively coupled to the blanket wheel 18 and has a belt 40 structured to engage a mandrel 54 (described below) and spin the mandrel 54.

In operation, a can body 1 is disposed over the distal end of a mandrel assembly 50 at the can body infeed 12. As the mandrel carrier 30 rotates, the mandrel assembly 50 with the can body 1 is moved toward the blanket wheel 18. Prior to engaging the blanket 20, the prespin assembly belt 40 engages the mandrel 54 and causes the mandrel 54 to spin about the mandrel assembly longitudinal axis. As the mandrel carrier 30 continues to rotate, the mandrel assembly 50 with the can body 1 is moved into engagement with an inked blanket 20, while spinning at a speed such that the can body 1 rotates once during the engagement with the blanket 20. This causes the ink on the blanket 20 to be transferred to the can body 1. The can transfer assembly 22 then removes the can body 1 from the mandrel assembly 50 and transfers the can body 1 to subsequent processing stations such as, but not limited to, a curing over 24.

Figure 3:
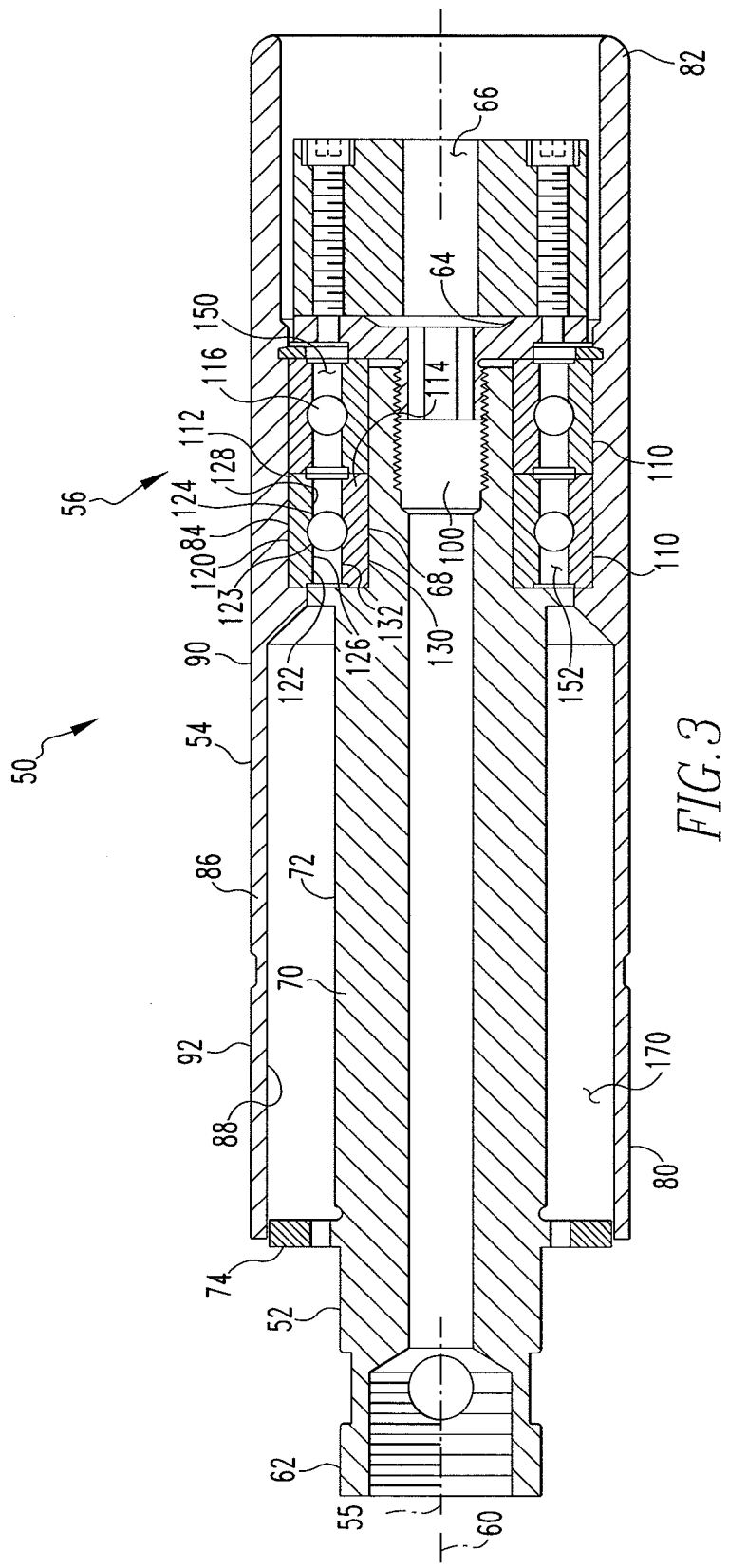
FIG. 3 is a cross-sectional view of a pivoting mandrel assembly.

As shown in FIG. 3, a mandrel assembly 50 includes an elongated mandrel shaft 52, a hollow, elongated mandrel 54, and a bearing assembly 56. The elongated mandrel shaft 52 has a longitudinal axis 60, a proximal end 62 and a distal end 64. The mandrel shaft 52 may define one or more passages 66 that are in fluid communication with a vacuum assembly and/or a pressurized air supply (neither shown). As is known, a vacuum drawn through the mandrel assembly 50 may be used to maintain the can body 1 in place during the can decoration operation and pressurized air may be used to remove the can body 1 from the mandrel 54. The mandrel shaft proximal end 62 is structured to be coupled to the mandrel carrier 30. The mandrel shaft longitudinal axis 60 extends substantially parallel to the mandrel carrier axis of rotation 34. Further, the mandrel shaft 52 has a bearing assembly seat 68, disposed adjacent the mandrel shaft distal end 64 which has a generally smooth outer surface and is structured to engage the bearing assembly 56. The mandrel shaft 52 also has a medial portion 70 disposed between the mandrel shaft proximal end 62 and the bearing assembly seat 68. The mandrel shaft medial portion 70 has a first radius defining an outer surface 72. Further, the mandrel shaft 52 has a flange 74 that, when the mandrel 54 is disposed on the mandrel shaft 52, as described below, is disposed adjacent the mandrel shaft proximal end 62 (discussed below). As shown, the mandrel 54 has a length about the same as the mandrel shaft 52. This, however, is not required and the mandrel 54 may be shorter. As described below, the mandrel shaft flange 74 is structured to block access to a gap 170 between the mandrel shaft 52 and the mandrel 54. Accordingly, the mandrel shaft flange 74 is positioned on the mandrel shaft 52 according to the length of the mandrel 54.

The mandrel 54, as noted is a hollow, elongated body having a longitudinal axis 55. The mandrel 54 is structured to be rotatably disposed about the mandrel shaft 52. The mandrel 54 is further structured to concentrically rotate about the mandrel shaft longitudinal axis 60. That is, the mandrel 54 spins on and about the mandrel shaft 52. The mandrel 54 has a proximal end 80, a distal end 82, a bearing assembly seat 84 adjacent the mandrel distal end 82, and a medial portion 86 disposed between the mandrel proximal end 80 and the mandrel bearing assembly seat 84. The mandrel medial portion 86 has a second radius defining the mandrel inner surface 88. Further, on the mandrel outer surface 90, a belt surface 92 exists. The belt surface 92 is structured to be temporarily engaged by the prespin assembly belt 40. That is, when the mandrel 54 is moved adjacent to the blanket wheel 18, as described above, the prespin assembly belt 40 engages the belt surface 92. As the prespin assembly belt 40 moves, the mandrel 54 spins about its longitudinal axis 55.

The bearing assembly 56 is structured to be disposed between the mandrel 54 and the mandrel shaft 52. When assembled, as described below, the bearing assembly 56 rotatably couples the mandrel 54 to the mandrel shaft 52. Moreover, the bearing assembly 56 defines a virtual pivot point 100 disposed substantially on the mandrel shaft longitudinal axis 60. The virtual pivot point 100 is configured to allow the mandrel 54 to pivot relative to the mandrel shaft 52. That is, due to the virtual pivot point 100, the mandrel longitudinal axis 55 may pivot relative to the mandrel shaft longitudinal axis 60. More specifically, the virtual pivot point 100 is structured to allow the mandrel longitudinal axis 55 to rotate between 0.00 and +/−0.20 degrees, or more preferably about +/−0.018 degrees, relative to the mandrel shaft longitudinal axis 60.

In one embodiment, the bearing assembly 56 includes at least one floating ball bearing unit 110. The ball bearing unit 110 includes an outer race 112, an inner race 114, and a plurality of ball bearings 116. The outer race 112 is a torus-shaped body having an outer surface 120 and an inner surface 122. The outer race inner surface 122 includes a bearing race 123 which is a groove 124. The outer race groove 124 has an arcuate cross-sectional shape having a proximal edge 126 and a distal edge 128. The curvature of the arcuate outer race groove 124 substantially corresponds with the curvature, or radius, of the ball bearings 116. The outer race outer surface 120 is structured to be coupled to the mandrel 54. The inner race 114 is also a torus-shaped body having an outer surface 130 and an inner surface 132. The inner race outer surface 130 includes a bearing race 134 which is a groove 136. The inner race groove 136 has an arcuate cross-sectional shape having a proximal edge 138 and a distal edge 140. The curvature of the arcuate inner race groove 136 substantially corresponds with the curvature, or radius, of the ball bearings 116. The inner race inner surface 132 is structured to be coupled to the mandrel shaft 52. The inner race outer surface 130 has a smaller radius than the outer race inner surface 122.

Figure 4:
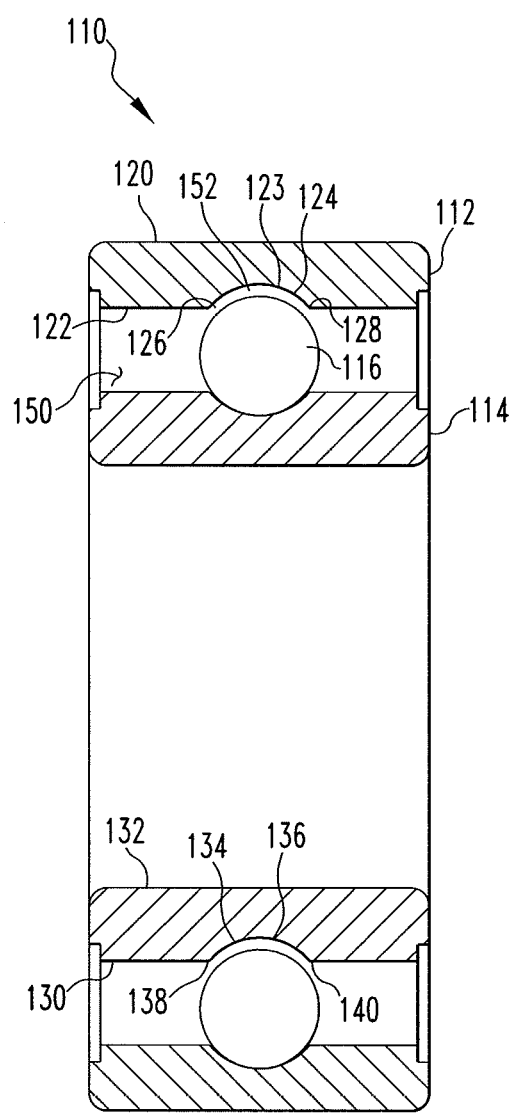
FIG. 4 is a cross-sectional view of a ball bearing unit.

When assembled, the ball bearing unit 110 includes the inner race 114 disposed within the outer race 112 and with each center, i.e. the center of each torus, substantially aligned. In this configuration, there is a gap 150 between the inner race outer surface 130 and the outer race inner surface 122. Moreover, the outer race groove 124 and the inner race groove 136 form a passage 152 and the ball bearings 116 are disposed therein. The ball bearing unit passage 152 is oversized as shown in FIG. 4, which is exaggerated for visibility. That is, the ball bearing unit passage 152 intentionally has a greater radial spacing than the diameter of the ball bearings 116. Thus, the outer race 112 "floats" relative to the inner race 114 in that a limited, i.e., less than the total, number of the ball bearings 116 effectively engage (while bearing more than an insignificant load) both the outer race 112 and the inner race 114.

Moreover, this configuration causes the ball bearing unit 110 to form a virtual pivot point 100. That is, because the passage 152 is oversized, the outer race 112 and the inner race 114 may pivot relative to each other about the virtual pivot point 100. The virtual pivot point 100 is substantially disposed at the center of the outer race 112 and the inner race 114. In this instance, "substantially disposed at the center" means that the virtual pivot point 100 is at, or insignificantly spaced from the center of the races 112, 114. It is noted that the center of the races 112, 114 is disposed along the mandrel shaft longitudinal axis 60. Thus, the virtual pivot point 100 is disposed substantially on the mandrel shaft longitudinal axis 60.

While the disclosed concept applies to ball bearing units 110 of any size, the following dimensions represent an embodiment for a ball bearing unit 110 having ball bearings 116 with about a 0.266 in. diameter. To allow the races 112, 114 to pivot between −0.20 and +0.20 degrees relative to each other, the ball bearing unit passage 152 has a radial clearance of between about 0.0002 inch and 0.0008 inch. In such a configuration, the races 112, 114 may also move radially and axially relative to each other thereby allowing the races 112, 114 to pivot relative to each other.

The bearing assembly 56 is the only coupling between the mandrel shaft 52 and the mandrel 54. Moreover, the bearing assembly 56 is located at a discrete location along the mandrel shaft longitudinal axis 60. That is, unlike prior mandrel assemblies which have bearings and/or other supports disposed at two or more locations along the mandrel assembly axis of rotation, the disclosed concept provides for a bearing assembly 56 disposed at a single location. Because the bearing assembly 56 is disposed at a single location, and because the bearing assembly 56 creates a virtual pivot point 100, the mandrel 54 may pivot relative to the mandrel shaft 52.

That is, each mandrel assembly 50 is assembled as follows. Each mandrel shaft 52 is mounted, either directly or indirectly, on the mandrel carrier 30. Each mandrel shaft longitudinal axis 60 extends substantially parallel to the mandrel carrier axis of rotation 34. The ball bearing unit inner race 114 is disposed in the mandrel shaft bearing assembly seat 68. The ball bearing unit inner race 114 is coupled to, and preferably fixed to the mandrel shaft 52. The mandrel 54 is disposed over the mandrel shaft 52 with the ball bearing unit outer race 112 disposed in the mandrel bearing assembly seat 84. The ball bearing unit outer race 112 is coupled to, and preferably fixed to the mandrel 54. In this configuration, the mandrel 54 is rotatably disposed on the mandrel shaft 52 and structured to concentrically rotate about the mandrel shaft longitudinal axis 60.

Moreover, because the bearing assembly 56 is the only coupling between the mandrel shaft 52 and the mandrel 54 and because the bearing assembly 56 forms a virtual pivot point 100, the mandrel 54 may pivot relative to the mandrel shaft 52, i.e. the mandrel longitudinal axis 55 may pivot relative to the mandrel shaft longitudinal axis 60. Preferably, the mandrel longitudinal axis 55 may pivot between 0.0 and 0.20 degrees, and more preferably about 0.18 degrees, relative to the mandrel shaft longitudinal axis 60. Further, the bearing assembly 56, and therefore the virtual pivot point 100, is located closer to the mandrel shaft distal end 64 than to the mandrel shaft proximal end 62. Further, because the bearing assembly 56 is located at a discrete location, the bearing assembly 56 does not include a bearing, ball bearing or any other bearing, closer to the mandrel shaft proximal end 62 than to the mandrel shaft distal end 64. Thus, the mandrel 54 is, essentially, supported at a single plane extending generally perpendicular to the mandrel shaft longitudinal axis 60.

Further, the bearing assembly 56 is, preferably, closer to the mandrel shaft distal end 64 than to the mandrel shaft proximal end 62. That is, it is preferable to not have the can body 1 supporting end of the mandrel 54 cantilevered relative to the mandrel shaft 52. Thus, the bearing assembly 56 is disposed closer to the mandrel distal end 82 than to the mandrel proximal end 80. Moreover, the disclosed concept requires that the mandrel 54 be free to pivot about the virtual pivot point 100, thus there cannot be a bearing, or any other support structure or coupling, spaced from the bearing assembly 56. That is, a structure supported at more than two points cannot pivot about one of the points. The bearing assembly 56 may, however, include two ball bearing units 110 that are disposed adjacent to each other. In this configuration, the oversized passages 152 in the ball bearing units 110 are structured to create a single virtual pivot point 100.

Further, in this configuration, and because the mandrel shaft medial portion 70 first radius is smaller than the mandrel medial portion 86 second radius, a gap 170 exists between the mandrel shaft medial portion 70 and the mandrel medial portion 86, as shown in FIG. 3. It is desirable to limit the amount of dust and other debris that passes into this gap 170 and which may subsequently damage the bearing assembly 56. Accordingly, the mandrel shaft flange 74 has a radius sufficient to, essentially, close the proximal end 80 of the mandrel assembly 50. That is, space between the mandrel shaft flange 74 and the mandrel inner surface 88 is less than about 0.030 in. It is noted that the mandrel shaft flange 74 does not touch the mandrel inner surface 88. Thus, the mandrel 54 is not supported by the mandrel shaft flange 74.

In this configuration, the mandrel 54, and more specifically the mandrel longitudinal axis 55, may pivot between 0.00 and 0.20 degrees, and more preferably about 0.18 degrees, relative to the mandrel shaft longitudinal axis 60. Thus, during a can decoration operation, when the blanket 20 engages the can body 1, the mandrel 54 will pivot about the virtual pivot point 100 until the axis of rotation for the can body 1, i.e. the mandrel longitudinal axis 55, and the blanket 20 axis of rotation, i.e. the blanket wheel axis of rotation 19, are significantly parallel. That is, the bias created by the pressure of the blanket 20 engaging a can body 1 automatically moves the mandrel 54 into significant alignment with the blanket wheel axis of rotation 19 (as well as the mandrel carrier axis of rotation 34). Thus, in this configuration, the mandrel shaft 52 may not need to have a pre-established toe-in to counter the bias created by the pressure of the blanket 20 engaging a can body 1.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A mandrel assembly comprising:
   an elongated mandrel shaft having a longitudinal axis, a proximal end and a distal end;
   a hollow, elongated mandrel structured to be rotatably disposed about said mandrel shaft and structured to concentrically rotate about said mandrel shaft longitudinal axis;
   a bearing assembly disposed at a discrete location between said mandrel and said mandrel shaft, whereby said bearing assembly rotatably couples said mandrel to said mandrel shaft;
   said mandrel shaft and said mandrel are coupled only by said bearing assembly; and
   said bearing assembly defining a virtual pivot point disposed substantially on said mandrel shaft longitudinal axis.

2. The mandrel assembly of claim 1 wherein the mandrel longitudinal axis can may pivot between 0.00 and 0.20 degrees relative to said mandrel shaft longitudinal axis at said virtual pivot point.

3. The mandrel assembly of claim 2 wherein the mandrel longitudinal axis can pivot 0.18 degrees relative to said mandrel shaft longitudinal axis at said virtual pivot point.

4. The mandrel assembly of claim 1 wherein said virtual pivot point is located closer to said mandrel shaft distal end than to said mandrel shaft proximal end.

5. The mandrel assembly of claim 4 wherein said bearing assembly does not include a bearing closer to said mandrel shaft proximal end than to said mandrel shaft distal end.

6. The mandrel assembly of claim 1 wherein said bearing assembly includes at least one ball bearing unit.

7. The mandrel assembly of claim 6 wherein said bearing assembly includes two ball bearing units.

8. The mandrel assembly of claim 7 wherein said two ball bearing units are disposed adjacent to each other.

9. The mandrel assembly of claim 1 wherein:
said mandrel shaft has a bearing assembly seat, disposed adjacent the mandrel shaft distal end, and a medial portion disposed between said mandrel shaft proximal end and said bearing assembly seat, said mandrel shaft medial portion having a first radius defining an outer surface;
said mandrel has a proximal end, a distal end, a bearing assembly seat adjacent said mandrel distal end, and a medial portion disposed between said mandrel proximal end and said mandrel bearing assembly seat, said mandrel medial portion having a second radius defining an inner surface;
said mandrel shaft first radius being smaller than said mandrel second radius whereby a gap exists between said mandrel shaft medial portion and said mandrel medial portion; and
said mandrel shaft having a flange that, when said mandrel is disposed on said mandrel shaft, is disposed adjacent said mandrel shaft proximal end, said mandrel shaft flange having an outer radius being less than, but substantially equal to said mandrel second radius whereby there is a clearance between said mandrel shaft flange and said mandrel inner surface.

10. A mandrel turret assembly comprising:
a mandrel carrier structured to rotate about an axis;
a plurality of elongated mandrel assemblies, each mandrel assembly having an elongated mandrel shaft, a hollow, elongated mandrel and a bearing assembly;
each said mandrel shaft having a longitudinal axis, a proximal end and a distal end;
each said mandrel shaft proximal end coupled to said mandrel carrier, each said mandrel shaft extending substantially parallel to said carrier axis of rotation;
each said mandrel structured to be rotatably disposed about a mandrel shaft and to rotate about said mandrel shaft's longitudinal axis;
each said bearing assembly disposed at a discrete location between a mandrel and a mandrel shaft, whereby each said bearing assembly rotatably couples a mandrel to a mandrel shaft;
said mandrel shaft and said mandrel are coupled only by said bearing assembly; and
each said bearing assembly defining a virtual pivot point disposed substantially on a mandrel shaft longitudinal axis.

11. The mandrel assembly of claim 10 wherein the mandrel longitudinal axis can pivot between 0.00 and 0.20 degrees relative to said mandrel shaft longitudinal axis at said virtual pivot point.

12. The mandrel assembly of claim 11 wherein the mandrel longitudinal axis can pivot 0.18 degrees relative to said mandrel shaft longitudinal axis at said virtual pivot point.

13. The mandrel assembly of claim 10 wherein said virtual pivot point is located closer to said mandrel shaft distal end than to said mandrel shaft proximal end.

14. The mandrel assembly of claim 13 wherein said bearing assembly does not include a bearing closer to said mandrel shaft proximal end than to said mandrel shaft distal end.

15. The mandrel assembly of claim 10 wherein said bearing assembly includes at least one ball bearing unit.

16. The mandrel assembly of claim 15 wherein said bearing assembly includes two ball bearing units.

17. The mandrel assembly of claim 16 wherein said two ball bearing units are disposed adjacent to each other.

18. The mandrel assembly of claim 10 wherein:
said mandrel shaft has a medial portion disposed between said mandrel shaft proximal end and said bearing assembly, said mandrel shaft medial portion having a first radius defining an outer surface;
said mandrel has a proximal end, a distal end, a bearing assembly seat adjacent said mandrel distal end, and a medial portion disposed between said mandrel proximal end and said mandrel bearing assembly seat, said mandrel medial portion having a second radius defining an inner surface;
said mandrel shaft first radius being smaller than said mandrel second radius whereby a gap exists between said mandrel shaft medial portion and said mandrel medial portion; and
said mandrel shaft having a flange that, when said mandrel is disposed on said mandrel shaft, is disposed adjacent said mandrel shaft proximal end, said mandrel shaft flange having an outer radius being less than, but substantially equal to said mandrel second radius whereby there is a clearance between said mandrel shaft flange and said mandrel inner surface.

* * * * *

UNITED STATES PATENT AND TRADEMARK OFFICE
CERTIFICATE OF CORRECTION

| | |
|---|---|
| PATENT NO. | : 8,596,624 B2 |
| APPLICATION NO. | : 12/797074 |
| DATED | : December 3, 2013 |
| INVENTOR(S) | : Karl Scott Fleischer |

It is certified that error appears in the above-identified patent and that said Letters Patent is hereby corrected as shown below:

In the claims

Column 8, line 50, Claim 2, "can may" should read --can--.

Signed and Sealed this
Tenth Day of November, 2015

Michelle K. Lee
*Director of the United States Patent and Trademark Office*